Oct. 2, 1962    R. P. KULISEK    3,056,577
BUSH RING SEAL FOR SPHERICAL PLUG VALVE
Filed Nov. 10, 1960    2 Sheets-Sheet 1
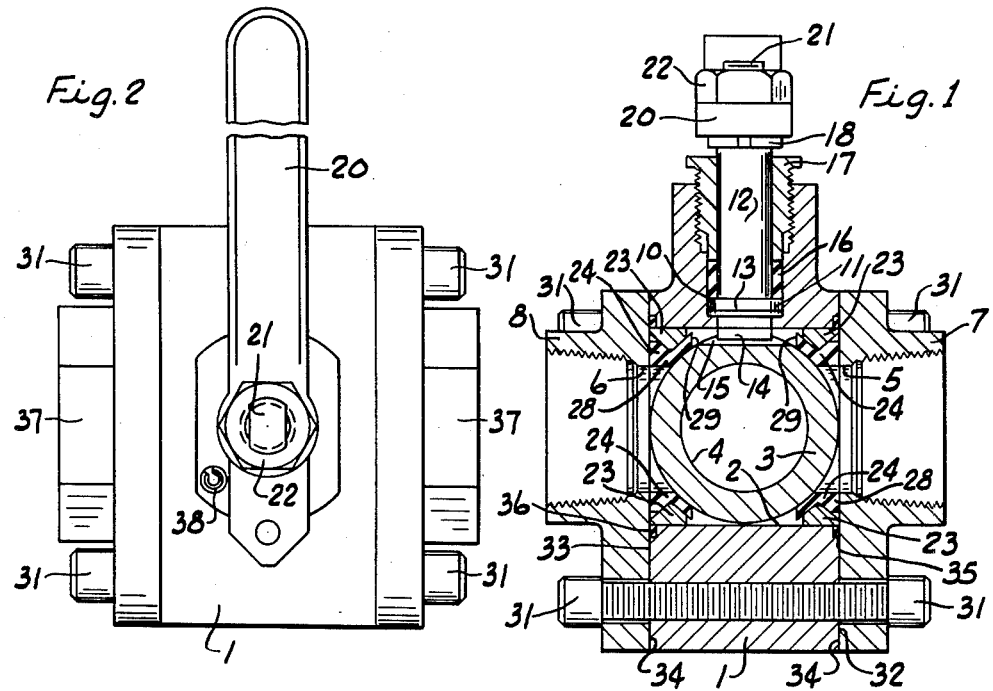
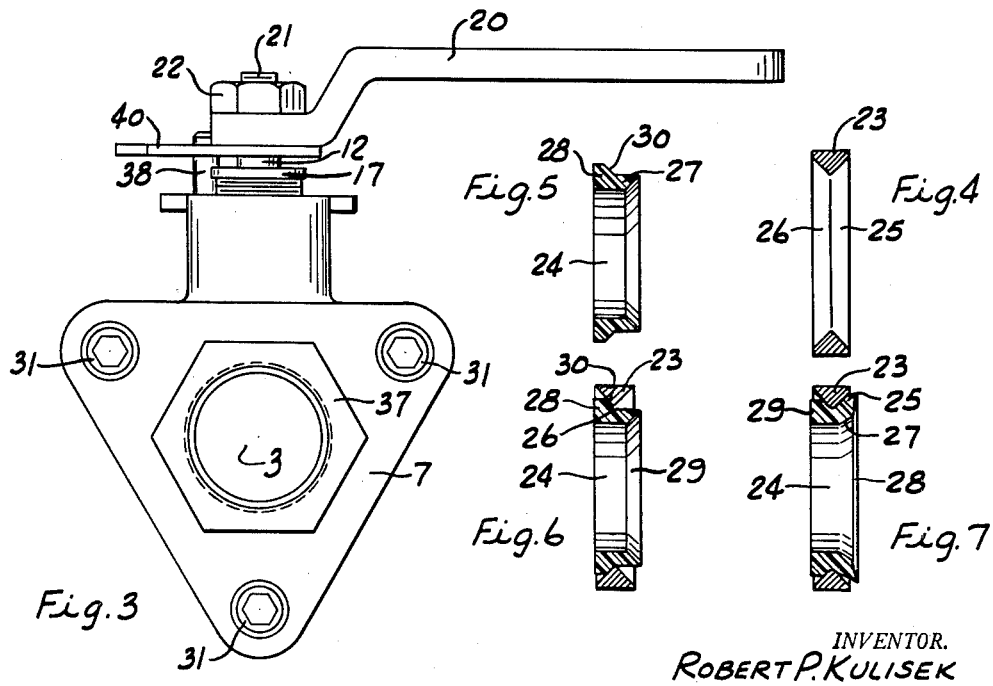
INVENTOR.
ROBERT P. KULISEK
BY William D. Carothers
HIS ATTORNEY Oct. 2, 1962     R. P. KULISEK     3,056,577
BUSH RING SEAL FOR SPHERICAL PLUG VALVE
Filed Nov. 10, 1960     2 Sheets-Sheet 2
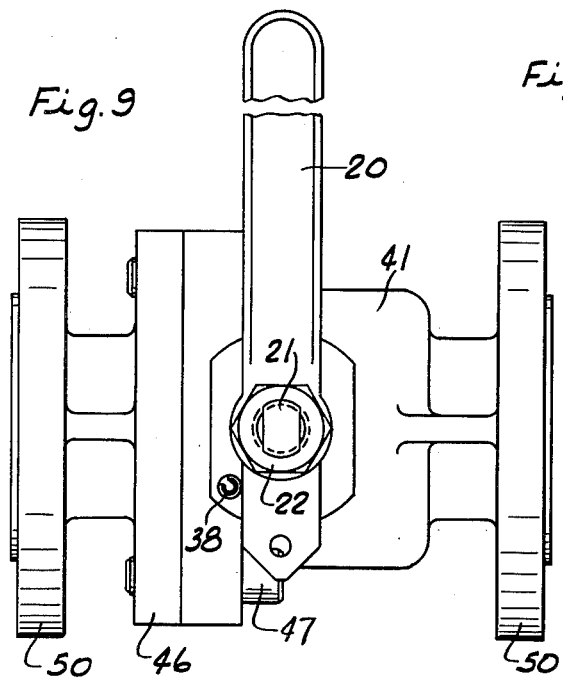
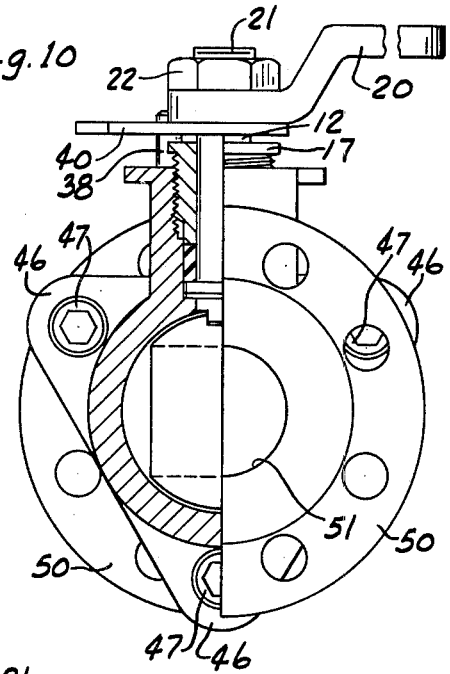
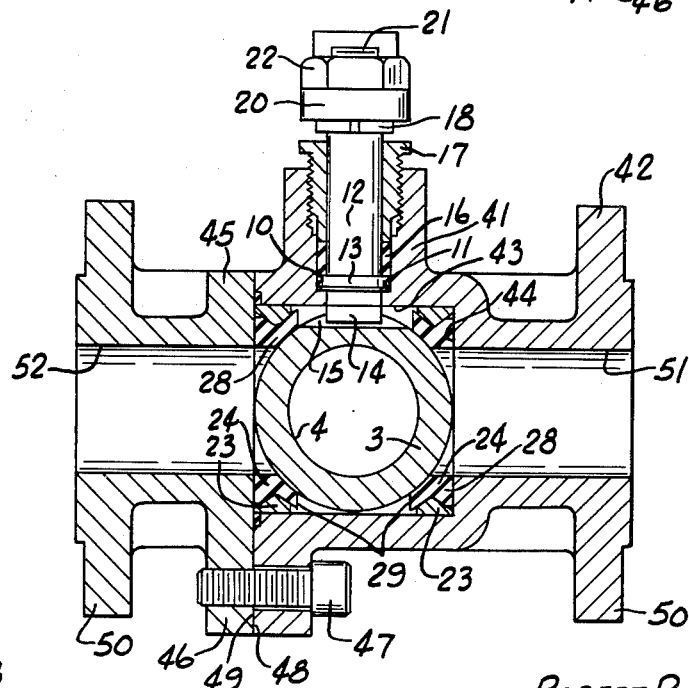
INVENTOR.
ROBERT P. KULISEK
BY William D. Carothers
HIS ATTORNEY United States Patent Office 3,056,577
Patented Oct. 2, 1962

3,056,577
BUSH RING SEAL FOR SPHERICAL PLUG VALVE
Robert P. Kulisek, Aliquippa, Pa., assignor to Homestead Valve Manufacturing Company, Coraopolis, Pa., a corporation of Pennsylvania
Filed Nov. 10, 1960, Ser. No. 68,485
2 Claims. (Cl. 251—315)

This invention relates generally to spherical ball type plug valves and more particularly to the seating and sealing member for such valves.

The principal object of this invention is the provision of a seating member in the form of a ring the bore of which is provided with oppositely facing sloping seating surfaces on which a seal member preferably of Teflon is in the form of a sleeve inserted in the ring and has a mating surface for one oppositely facing sloping seating surface. The balance of the sleeve extending through the ring and being pre-formed so that its other end extends over the opposite sloping seating surface. The initial portion of the sleeve is employed to seat on the tailpiece of the valve; whereas the opposite end of the sleeve is seated against the spherical surface of the plug valve, the bore of the sleeve engaging the spherical surface of the valve and becoming seated thereon when compressed by attaching the tailpiece to the valve body.

When both tailpieces are secured in this manner and at the same time the seal member on opposite sides of the spherical plug are thus completely formed by attaching the tailpieces to the valve body and thereafter will function as a seal.

Another object of this invention is the provision of a spherical plug valve having a cylindrical valve chamber sufficiently large to receive the spherical ball valve provided with a slot on the top thereof in which the valve stem enters to rotate the same. However, the valve is supported by seating members on each side of the spherical ball.

Another object is the provision of a spherical plug valve in which the spherical plug has an external diameter substantially the width of the valve body and is supported in the valve body by independent seal means engaging the opposite sides of the spherical ball which are held in place by tailpieces secured to the body and having cooperatively flat faces between the tailpieces and the body to permit the latter to be withdrawn laterally from the tailpieces when they are connected to a piping system without disturbing the piping system.

Another object is the provision of a spherical plug type valve having independent seating means on each side of the ball to support the same and to seal with the ball surface under predetermined pressure when the tailpieces are secured to the body member making a metal to metal contact with the body member to limit the pressure forming the seal.

Another object of this invention is the provision of a novel valve stem arrangement which is sealed independently of the ball valve. The independent sealing means for supporting the ball and for sealing the stem provides a simplicity in the construction of this spherical ball type plug valve making the same economical to manufacture and readily assembled, disassembled and repaired.

Other objects and advantages of this invention appear hereinafter in the following description and claims.

The accompanying drawings show for the purpose of exemplification without limiting this invention or the claims thereto, certain practical embodiments illustrating the principles of this invention; wherein FIG. 1 is a sectional view of a spherical type plug valve illustrating this invention.

FIG. 2 is a top plan view of FIG. 1.

FIG. 3 is an end view of the valve shown in FIGS. 1 and 2.

FIG. 4 is a sectional view of the seat ring.

FIG. 5 is a sectional view of the seal member.

FIG. 6 is a view showing the seal member extending into the seat ring.

FIG. 7 is a sectional view of the seal member crimped on the seat ring.

FIG. 8 is a sectional view showing the modification of the valve.

FIG. 9 is a top plan view of the valve shown in FIG. 8.

FIG. 10 is a partial section and end view of the structure shown in FIG. 8.

Referring to FIGS. 1 to 7 of the drawings the valve body 1 has a central passage or valve chamber 2 extending therethrough. This passage is cylindrical and is slightly larger than the outer diameter of the spherical plug member 3. The plug 3 is rotatable in the chamber 2 and is provided with a flow passage 4 for the purpose of connecting the flow passages 5 and 6 of the closure means or tailpiece members 7 and 8.

The body 1 is provided with a lateral bore 10 connected with an inner smaller bore 11 for receiving the plug control means or valve stem 12. The valve stem is provided with an annular shoulder 13 that rests on the bottom of the bore 10. The stem 12 being smaller on either side of the shoulder 13. The under side of the shoulder 13 is provided with a flattened key member 14 that fits into the slot 15 on the top of the ball plug 3. An annular sleeve packing 16 is seated on top of the shoulder 13 and is compressed by the gland member 17 threadably received in the bore 10. The top of the stem 12 is provided with a nonround section 18 for receiving the indicator 40 and the handle 20 and the top of the stem is threaded as indicated at 21 for receiving the nut 22 to retain the handle 20 on the stem.

The ball plug is supported by the two ring members 23 which have mounted therein the resilient sealing means or Teflon seal and seating member 24. As shown in FIG. 4 the rings 23 are preferably metal and have oppositely disposed faces or annular lateral seating surfaces 25 and 26 in the bore thereof. The seat or seal member 24 is in the form of a sleeve having a cylindrical section 27 and a foot member 28. A sloping surface 30 of the foot 28 is arranged to rest against the seat or face 26 as shown in FIG. 6. It will be noted that the foot extends slightly beyond and is slightly larger than the ring 23. The end of the sleeve 27 is beveled as indicated at 29 which bevel is placed against a forming tool that forces the Teflon to the shape illustrated in FIG. 7 where the sleeve 27 is shoved against the seating surface 25 and the flared surface 29 is substantially flat or normal to the axis of the ring 23. After the Teflon has been pre-formed in the manner as illustrated in FIG. 7 and inserted into the valve chamber with the tailpieces 7 screwed in place by the clamping means cap screws 31, the frusto conical surface 28 is substantially parallel with the side faces 32, 33 of the valve body 1. The faces 32 and 33 lie in parallel planes and are flat and they have a corresponding face 34 on the tailpieces 7 and 8. The surfaces 32, 33 and 34 are cooperative stop or gauge surfaces which prevent further deformation of the seal members 24 on their rings 23. The bores 5 and 6 of the tailpieces 7 and 8 are substantially the same diameter as that of the formed seal member 24 and the surface 34 of these tailpieces back up the foot 28 of the seal members and deform the same so as to provide a good support for the ball plug in the chamber 2. Thus the Teflon in the form of the seal rings 24 is actually deformed upon making up the valve and is illustrated in FIG. 1 and the bore of the sleeve 27 actually forms the seating surface on the spherical valve.

If the threaded tailpieces 7 and 8 are secured in a piping system one need only remove the cap screws 21 to slip out the valve body, change the seating members and then replace the same. In this manner one can readily maintain repairs of leaky valves at a relatively low cost.

An additional flat seal as indicated at 35 is inserted in a shoulder 36 indented from the parallel faces 32 and 33 of the valve body. These shoulders define the valve opening 2 at the ends thereof. The sealing material in the seal 35 is preferably of Teflon.

As shown in FIGS. 2 and 3 the tailpieces 7 and 8 have a nonround section 37 for receiving the wrench to hold the same while the pipe is being threaded into its bore. These tailpieces are triangular in shape and the cap screws 31 are at each of the apices of this triangular shaped structure. The valve body is similarly shaped. A stop pin 38 is provided in the neck to be engaged by the indicator 40 to stop the valve at its closed position. The valve being turned at 90° the stop pin is again in position to gauge the indicator 40 and indicate the valve has had its fully open position.

In the structure shown in FIGS. 8 to 10 the valve body 1 has an integral tailpiece 42 and the valve chamber 43 is provided with a shoulder 44 equivalent to the cooperative stop or mating surfaces 32 and 34 of the tailpiece 7 for backing up and supporting the ring member 23 and its seal 24. The plug and the valve stem are the same as that shown in the other views.

The closure means or tailpiece 45 has a triangular flange 46 to receive the clamping means or cap screws 47 to clamp the mating and cooperating stop surfaces or faces 48 and 49 on the tailpiece 45 and the valve body 41. The outer flange of the tailpiece 42 and 45 is circular as indicated in FIG. 10 at 50 and is provided with a series of bolt openings 51 for securing these flanges to the adjacent flange of another portion of the system or to the end of a tubing string.

Here the cooperating stop or gauge surfaces 48 and 49 function in the same manner in providing a stop to determine the maximum pressure and deformation of the seal members 24 in the valve chamber 43. Here again the ball plug valve is rotatably supported on these seal members and when it is turned to its open position its passageway 4 becomes aligned with the passages 51 and 52 and the tailpieces 42 and 45 respectively.

I claim:
1. A spherical plug valve consisting of a valve body, a valve chamber extending through said body, a closure means partially closing each end of said valve chamber, cooperative stop surfaces on said closure means and said body, each closure means having a flow passage communicating with said valve chamber, a spherical plug rotatably mounted in said valve chamber, plug control means extending from said valve chamber to operate said plug, said plug having a flow passage for registry with the flow passages of said closure means, an annular metal ring member inwardly of each closure means and in said valve chamber, an annular lateral seating surface on each side of each ring member converged toward each other in the center of the ring member, a resilient sealing means on each ring fitting and extending from one seating surface to the other on said annular metal ring member and in bearing engagement with the spherical surface of said plug at one end and with said closure means at the other end and forming the passageway therebetween, said resilient sealing means backed up by the lateral seating surface of each annular metal ring member to support said spherical plug and extending therebeyond, and clamping means to retain said closure means stop surfaces on the cooperative stop surfaces of said body to close said valve chamber and maintain said resilient sealing means in bearing engagement between said seating surfaces and the adjacent spherical surface of said plug.

2. The spherical plug valve of claim 1 characterized in that said annular metal ring members have their outer cylindrical surfaces filling the bore of said valve chamber, and the outer face of each annular metal ring member engaging the adjacent closure means to insure the support of said spherical plug and extending around said resilient sealing means.

References Cited in the file of this patent
UNITED STATES PATENTS

| Re. 24,102 | Ohls | Dec. 13, 1955 |
| 2,606,738 | Glenn | Aug. 12, 1952 |
| 2,886,282 | Miller | May 12, 1959 |

FOREIGN PATENTS

| 207,524 | Australia | Sept. 15, 1955 |
| 759,218 | Great Britain | Oct. 17, 1956 |